United States Patent [19]
Blaner et al.

[11] Patent Number: 5,649,178
[45] Date of Patent: Jul. 15, 1997

[54] APPARATUS AND METHOD FOR STORING AND INITIALIZING BRANCH PREDICTION WITH SELECTIVE INFORMATION TRANSFER

[75] Inventors: Bartholomew Blaner, Underhill Center, Vt.; Stamatis Vassiliadis, Zoetermeer, Netherlands

[73] Assignee: International Business Machines, Corporation, Armonk, N.Y.

[21] Appl. No.: 474,017

[22] Filed: Jun. 7, 1995

[51] Int. Cl.⁶ ................................................ G06F 9/42
[52] U.S. Cl. ................................................... 395/587
[58] Field of Search ................... 364/DIG. 1 MS File, 364/DIG. 2 MS File; 395/375, 800, 376, 580, 581, 582, 583, 584, 585, 586, 587

[56] References Cited

U.S. PATENT DOCUMENTS

| | | | |
|---|---|---|---|
| 4,679,141 | 7/1987 | Pomerene et al. | 395/375 |
| 5,163,140 | 11/1992 | Stiles et al. | 395/467 |
| 5,287,467 | 2/1994 | Blaner et al. | 395/375 |
| 5,423,011 | 6/1995 | Blaner et al. | 395/375 |

OTHER PUBLICATIONS

Johnny K. F. Lee et al., "Branch Prediction Strategies & Branch Target Buffer Design" (Jan. 1984) Computer Magazine pp. 6–22.

Smith "A Study of Branch Prediction Strategies" Control Data Corporation IEEE (1981) pp. 135–148.

Primary Examiner—Robert B. Harrell
Attorney, Agent, or Firm—Whitham, Curtis, Whitham & McGinn; Arthur J. Samodovitz

[57] ABSTRACT

Apparatus for retaining the branch prediction bits of a line displaced from an integrated cache/branch history table and using the retained bits to initialize the prediction bits should that line be brought back into the cache, the operation of which may be overlapped with the activities normally associated with displacing a cache line with one fetched from memory, thus imposing no instruction processing penalty. The apparatus consists of an associative memory that provides storage for branch prediction bits associated with cache lines and comparison means for matching stored prediction bits with their corresponding cache lines.

5 Claims, 3 Drawing Sheets

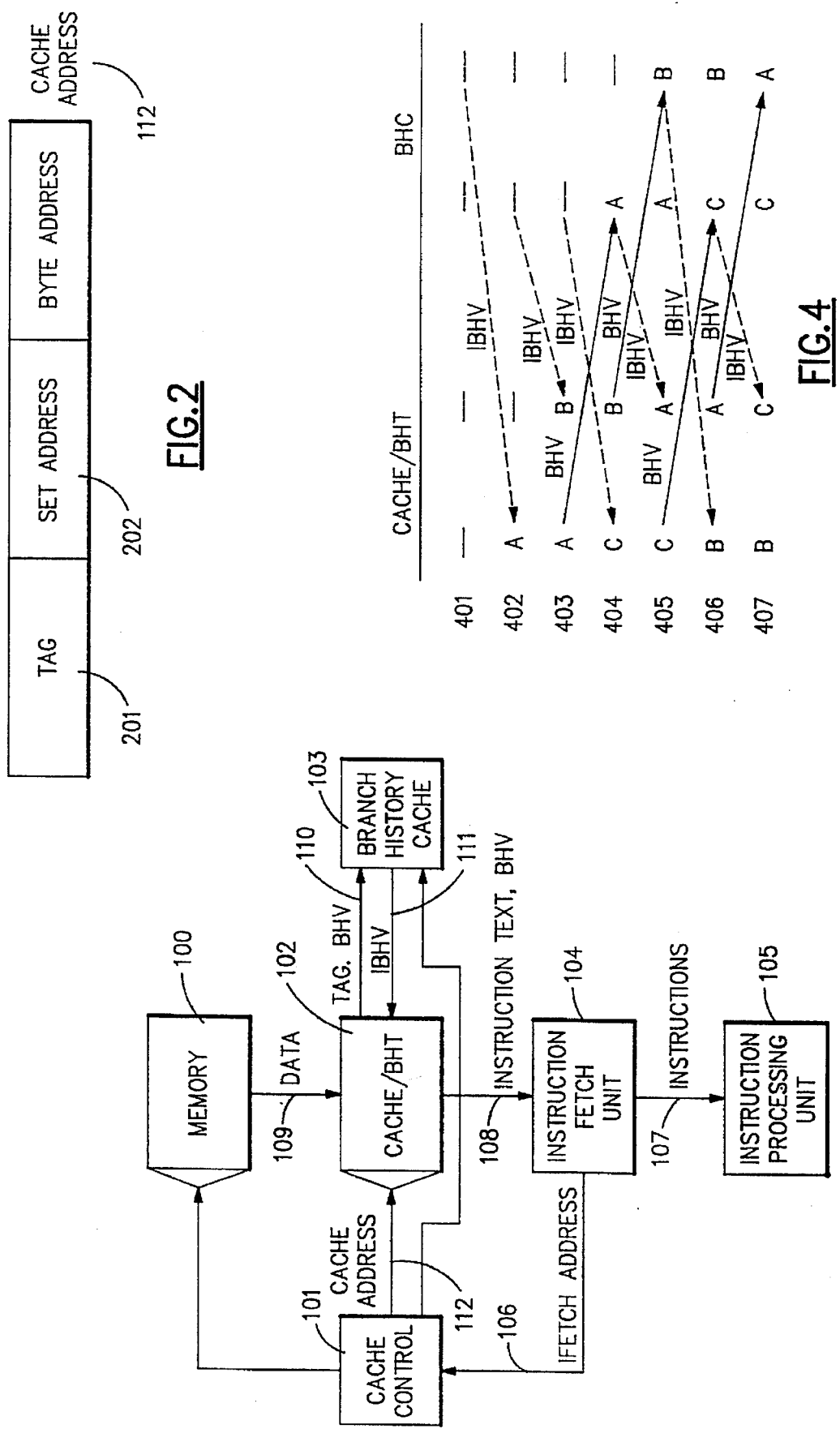

APPARATUS AND METHOD FOR STORING AND INITIALIZING BRANCH PREDICTION WITH SELECTIVE INFORMATION TRANSFER

FIELD OF THE INVENTION

This invention relates to high-speed computers and computer systems and particularly to computer systems which employ hardware apparatus for predicting the outcome of branch instructions.

CROSS REFERENCE TO RELATED APPLICATION

The present application is related to the following U.S. Pat. No. 5,287,467.

U.S. patent application Ser. No. 07/687,309, filed Apr. 18, 1991, entitled "Branch Instruction Processor," the inventors being Bartholomew Blaner, et al., now U.S. Pat. No. 5,287, 467.

This U.S. Pat. No. 5,287,467 and the present application are owned by one and the same assignee, International Business Machines Corporation of Armonk, N.Y.

The description set forth in U.S. Pat. No. 5,287,467 is incorporated into the present application by reference.

REFERENCES USED IN THE DISCUSSION OF THE INVENTION

During the detailed description which follows the following works will be referenced as an aid for the reader. These additional references are:

Lee, J. K. F. and A. J. Smith, "Branch Prediction Strategies in Branch Target Buffer Design," IEEE Computer, January, 1984.

Smith, J. E., "A Study of Branch Prediction Strategies," Proceedings of the Eight Annual Symposium on Computer Architecture, March 1981.

These additional references are incorporated by reference.

BACKGROUND OF THE INVENTION

1. Field of the Invention

This invention concerns the operation of digital computers, and is particularly directed to the processing of branch instructions in a digital computer.

2. Description of Related Art

Branch instructions can reduce the speed and efficiency of instruction processing in a computer. This performance penalty is especially severe in computers which perform pipelined instruction processing and is worse still in computers which have multiple pipelined functional units. Branch prediction schemes have been proposed to reduce the performance penalty caused by branch instruction execution. One such scheme involves dynamic prediction of branch outcomes by tagging branch instructions in a cache with predictive information regarding their outcomes. See, for example, the article by J. E. Smith entitled "A Study of Branch Prediction Strategies," in the March 1981 Proceedings of the Eight Annual Symposium on Computer Architecture, and co-pending application Ser. No. 07/687, 309. Typically, the predictive information is in the form of bits which record the execution history of the associated branch instructions. A single prediction bit is used to record whether the branch was taken or not taken on its most recent execution. When the branch instruction is fetched for execution again, the branch is predicted to take the direction it did last time. If the prediction turns out to be incorrect, the history bit is updated to reflect the actual branch outcome. Multiple prediction bits may be used to facilitate more elaborate prediction schemes. Several multiple bit prediction algorithms are described in the article by J. K. F. Lee and A. J. Smith, entitled "Branch Prediction Strategies in Branch Target Buffer Design," in the January, 1984 issue of IEEE Computer.

Once the history of a branch instruction is established, i.e., after it has been executed at least one time, the outcome of the branch on its next execution can be predicted with a high degree of accuracy. Establishing the initial state of the prediction bits poses a problem, however, since no history information is available when a line is brought into the cache. The simplest solution is to initialize the bits to some arbitrary value, for example, to a value that will cause a "not taken" branch prediction to be made for all branch instructions in the line. Unfortunately, for truly conditional branches, this is seldom more than 50% accurate. Accuracy improves dramatically when actual branch history can be recorded and used for subsequent predictions. It is therefore desirable to retain branch history bits indefinitely, i.e., as long as there is a chance that the associated branch instruction will be executed again. This, however, conflicts with the finite nature of cache storage: a line or block of data, typically data least recently used, may be displaced to make room for a new line of data requested by the processor. For a cache having branch instructions tagged with branch history bits, not only are the cache data discarded but the branch history bits are discarded as well. If the line is ever fetched from memory again and brought back into the cache, the branch history bits must be initialized arbitrarily as described, resulting in decreased instruction processing performance because of decreased branch prediction accuracy.

SUMMARY OF THE INVENTION

The improvement we have made achieves an enhancement in initializing the branch history bits associated with a cache line. This improvement is accomplished by providing apparatus for retaining the branch prediction bits for a displaced cache line and using the retained bits to initialize the prediction bits should that line be brought back into the cache. The operation of the apparatus may be overlapped with the activities normally associated with displacing a cache line with one fetched from memory and thus imposes no instruction processing penalty.

The apparatus comprises an associative memory that provides storage for branch prediction bits associated with cache lines and comparison means for matching stored prediction bits with their corresponding cache lines. This improvement is set forth in the following detailed description. For a better understanding of the invention with advantages and features, reference may be had to the description and to the drawings.

BRIEF DESCRIPTION OF THE DRAWINGS

Referring to the drawings:

FIG. 1 shows a representative embodiment of a portion of a digital computer system constructed in accordance with the present invention;

FIG. 2 shows a cache address apportioned into tag, set address, and byte address fields;

FIG. 4 shows an example of the operation of the preferred embodiment.

DETAILED DESCRIPTION OF THE INVENTION

Figure 3A:
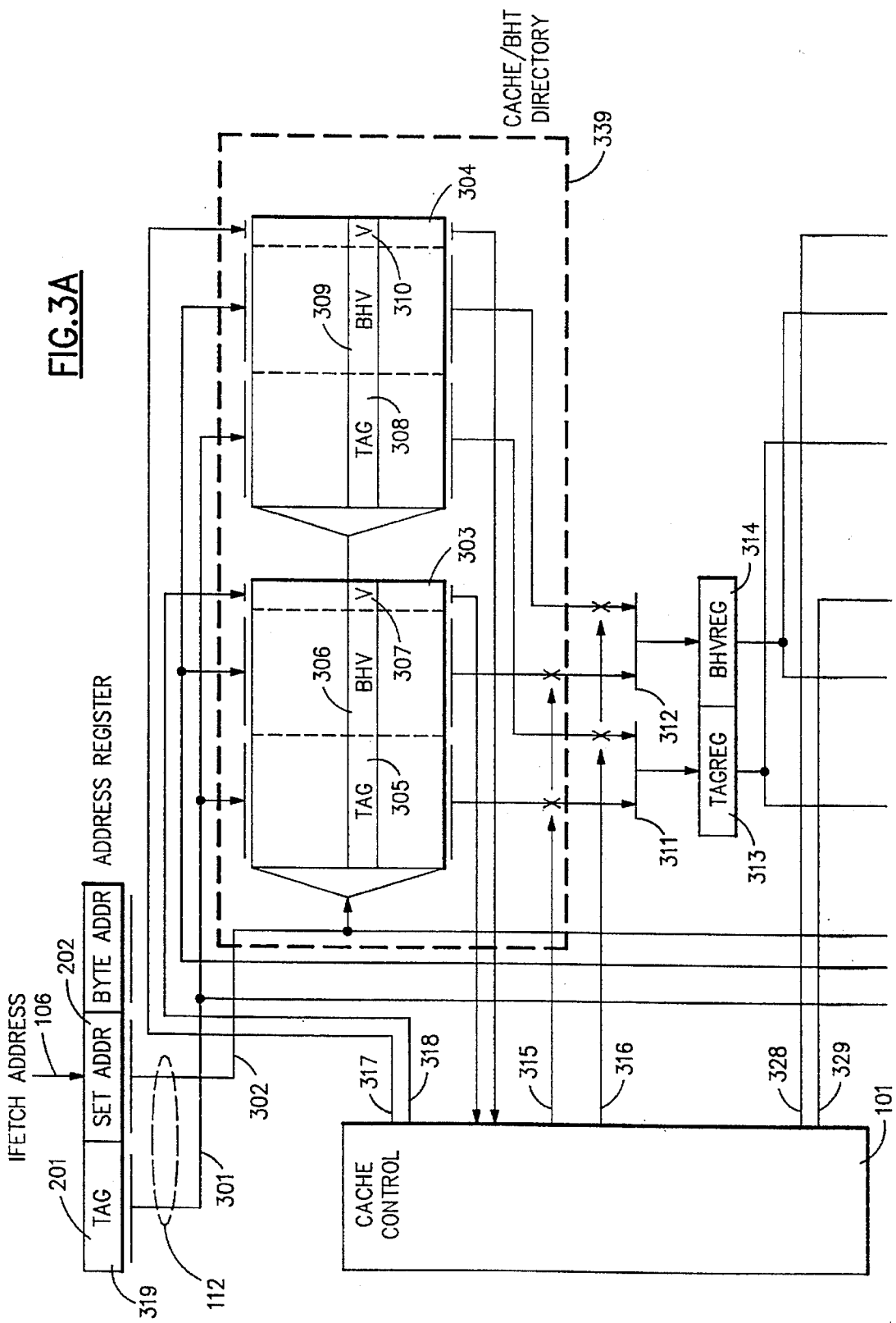
FIG. 3 shows in greater detail the internal construction of a representative embodiment of a branch history cache which can be used in the computer system of FIG. 1.

Referring to FIG. 1 of the drawings, there is shown a representative embodiment of a portion of a digital computer system in accordance with the present invention. It includes memory 100 coupled by data lines 109 to cache/BHT (branch history table) 102. Cache/BHT 102 provides temporary storage for lines of data received from memory 100 and also provides branch history bits for branch instructions contained within the data. Thus, cache/BHT 102 provides for dynamic prediction of branch outcomes by tagging branch instructions in the cache with predictive information regarding their outcomes as described in the article by J. E. Smith and co-pending application Ser. No. 07/687,309 (IBM Docket EN9-90-023). The branch history bits associated with a line of data in cache/BHT 102 are collectively referred to as a branch history vector (BHV). Cache/BHT 102 supplies instruction text and the corresponding BHV to instruction fetch unit 104 on lines 108 in response to an instruction fetch request transmitted to cache control logic 101 on IFetch address lines 106. Instruction fetch unit 104, in turn, supplies a stream of instructions to instruction processing unit 105 on lines 107. Branch history cache 103 is shown operatively connected to cache/BHT 102 by tag and BHV lines 110 and IBHV lines 102. Cache control logic 101 receives address and control information from instruction fetch unit 104 and provides address and control signals to cache/BHT 102, memory 100, and branch history cache 103.

The Preferred Embodiment

Figures 3, 3B:
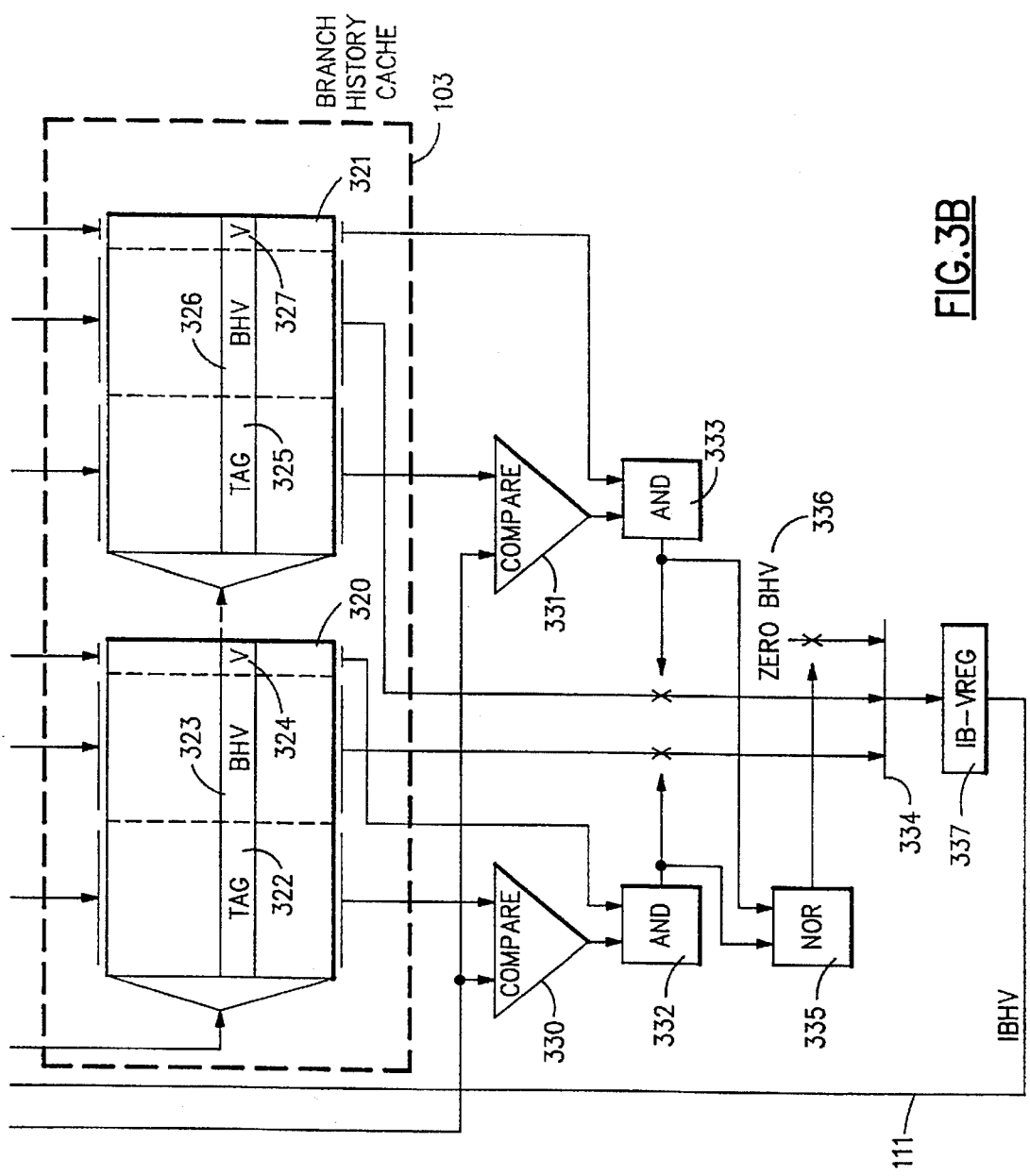

Turning now to our invention in greater detail, it will be seen from FIG. 1 that data are fetched from memory 100 and brought into cache/BHT 102 and subsequently made available to instruction processing unit 105 for execution via instruction fetch unit 104. Data are brought into the cache in lines and placed into cache/BHT 102 according to mechanisms that are well known in the art, and consequently not reiterated here. Lines are mapped into the cache based on a certain portion of cache address 112, the set address 202 in FIG. 2. Lines whose addresses differ in the set address portion of the cache address are said to reside in different sets. Multiple lines may exist in the cache in the same set if the cache is so designed, and lines in the same set are said to reside in different associativity classes. The particular design shown in FIG. 3 is that of a two-way associative cache. However, the invention is equally applicable to caches with lesser or greater associativity. Within an addressed set, selection of the associativity class in which a particular instruction requested by instruction fetch unit 104 resides is accomplished by comparing a certain portion of cache address 112, the tag portion 201 in FIG. 2, with tags stored in the directory portion of cache/BHT 102. The directory contains one tag for each associativity class in a set. If the tag portion 201 matches a valid tag contained in the directory set addressed by set address 202, a cache hit has occurred and the instruction text and corresponding BHV is supplied to instruction fetch unit 104. Otherwise, a cache miss has occurred and the instruction must be fetched from memory 100. The process of fetching a line from memory in response to a cache miss is known as cache miss servicing and typically takes considerably more time than that required to execute an instruction in instruction processing unit 105. Since there are a finite number of associativity classes in a set, it is likely that a line in the set must be displaced by the line being fetched from memory.

Branch history cache 103 operates in two phases during the cache miss servicing time. The first phase, the retention phase, operates to retain a BHV of a line that is being displaced from the cache/BHT. During this phase, the tag and BHV of the corresponding line are transmitted to branch history cache 103 on lines 110 and saved in the branch history cache. The second phase, the retrieval phase, operates to supply cache/BHT 102 with an initial BHV, or IBHV, on lines 111 for the line being fetched from memory 100. The phases occur sequentially and in order under the control of cache control logic 101. Like cache/BHT 102, branch history cache 103 is an associative memory. The particular design shown in FIG. 3 has the same organization as cache/BHT 102. However, this need not be the case. Any combination of associativity classes and sets may be employed. One skilled in the art may give preferential consideration to those combinations that provide superior instruction processing performance.

FIG. 3 shows a preferred embodiment of the invention. Cache/BHT directory 339 is the directory and BHT portion of cache/BHT 102 in FIG. 1. Circuits required for normal cache/BHT operation are well known in the art and are not shown in FIG. 3. Cache/BHT directory 339 is partitioned into two associativity classes 303 and 304. Each associativity class is partitioned into some number of sets, A set is addressed by the SET ADDR 202 portion of address register 319 on lines 302. The intersection of a set and an associativity class is known as an entry and each entry is further partitioned into TAG, BHV, and V (valid) bit fields. A representative entry is shown for each associativity class. For associativity class 303, the representative entry is comprised of TAG 305, BHV 306, and V bit 307. For associativity class 304, the representative entry is comprised of TAG 308, BHV 309, and V bit 310. Cache control logic 101 may assert signal 315 to gate TAG 305 and BHV 306 through multiplexers 311 and 312. Alternatively, it may assert signal 316 to gate TAG 308 and BHV 309 through multiplexers 311 and 312. The output of multiplexer 311 is latched in TAGREG register 313. The output of multiplexer 312 is latched in BHVREG register 314. Cache control logic 101 also receives V bit 307 from associativity class 303 and V bit 310 from associativity class 304. A V bit is set to 1 if the entry is valid. Initially, all entries have V equal to 0. Entries are made valid as data are brought into the cache from memory in accordance with the usual operation of cache storage.

Branch history cache 103 is likewise partitioned into two associativity classes 320 and 321. Each associativity class is partitioned into some number of sets addressed by the SET ADDR 202 portion of address register 319 on lines 302. Each intersection of a set and an associativity class, i.e., an entry, is further partitioned into TAG, BHV, and V (valid) bit fields. A representative entry is shown for each associativity class. For associativity class 320, the representative entry is comprised of TAG 322, BHV 323, and V bit 324. For associativity class 321, the representative entry is comprised of TAG 325, BHV 326, and V bit 327. Each TAG field is connected for an input to TAGREG 313. Each BHV field is connected for an input to BHVREG 314. V bit 324 may be set to 1 or reset to 0 by cache control logic 101 via signal 329. V bit 327 may be set to 1 or reset to 0 by cache control logic 101 via signal 328. A V bit is set to 1 if the entry is valid. Initially, all entries have V equal to 0. Entries are made valid as valid data are brought into the branch history cache from cache/BHT directory 339 via TAGREG 313 and BHVREG 314. TAG 322 is connected to compare circuit 330. The TAG 201 portion of address register 319 is also connected to compare circuit 330. The output of compare circuit 330 is equal to 1 if the two inputs are equal. If the output of compare circuit 330 is 1 and V bit 324 is 1, then the output of AND gate 332 is 1, and BHV 323 is gated through multiplexer 334. TAG 325 is connected to compare circuit 331. The TAG 201 portion of address register 319 is also connected to compare circuit 331. The output of compare circuit 331 is equal to 1 if the two inputs are equal. If the output of compare circuit 331 is 1 and V bit 327 is 1, then the output of AND gate 333 is 1, and BHV 326 is gated through multiplexer 334. If the output of either AND gate 332 or AND gate 333 is equal to 1, a branch history cache hit is said to have occurred. The outputs of AND gates 332 and 333 are also connected to NOR gate 335. If neither AND gate 332 output nor AND gate 333 output is equal to 1, then a branch history cache miss is said to have occurred, and the output of NOR gate 335 will be equal to 1. The output of NOR gate 335 will gate ZERO IBHV 336 through multiplexer 334. The output of multiplexer 334 is latched in IBHVREG 337, the initial BHV register. The output of IBHVREG 337 is connected to the BHV portions of cache/BHT directory associativity classes 303 and 304 via IBHV lines 111.

ZERO BHV 336 is an arbitrary branch history vector of all zeros. In the embodiment, this means "all branches predicted not taken." ZERO BHV 336 is thus supplied to cache/BHT directory 339 as an initial BHV (IBHV) when a branch history cache miss occurs.

The operation of the invention in the preferred embodiment will now be described. The invention operates in two phases during the cache miss servicing time. The first phase, the retention phase, operates to retain a BHV of a valid entry that is being displaced from cache/BHT directory 339 in FIG. 3. For displacement to occur, both entries in the set addressed by SET ADDR 202 must have V equal to 1. If this is not the case, then the retention phase is aborted and the sequence of control proceeds to the retrieval phase. If it is the case, then cache control logic 101 decides which of the two valid entries to displace. Typically, the cache control logic maintains a record of the least recently used (LRU) entry and will select the LRU entry to be displaced. If the entry in associativity class 303 is selected, signal 315 is asserted to gate the entry into TAGREG 313 and BHVREG 314. If the entry in associativity class 304 is selected, signal 316 is asserted to gate the entry into TAGREG 313 and BHVREG 314. Cache control logic 101 will now store the contents of TAGREG 313 and BHVREG 314 in an entry in branch history cache 103 at the location addressed by the SET ADDR 202 portion of address register 319. If either entry in the branch history cache set has V equal to 0, the entry with V equal to 0 is filled from TAGREG 313 and BHVREG 314 and its V bit is set to 1. If neither entry in the set has V equal to 0, i.e., both entries are already valid, cache control logic 101 must choose which entry to displace. This choice may be made via LRU selection means, random selection means, or any such selection means one skilled in the art may choose to displace valid entries in the branch history cache. The selected entry is filled from TAGREG 313 and BHVREG 314 and its V bit is set to 1.

The second phase, the retrieval phase, operates to supply cache/BHT directory 339 with an initial BHV on lines 111 for the line being fetched from memory. The set in branch history cache 103 addressed by the SET ADDR 202 portion of address register 319 is accessed. TAG 322 is compared to the TAG 201 portion of address register 319 by compare circuit 330. Simultaneously, TAG 325 is compared to the TAG 201 portion of address register 319 by compare circuit 331. If TAG 322 is equal to TAG 201 and V bit 324 is equal to 1, then the output of AND gate 332 is equal to 1 and BHV 323 is gated through multiplexer 334 and latched in IBHVREG 337. If, on the other hand, TAG 325 is equal to TAG 201 and V bit 327 is equal to 1, then the output of AND gate 333 is equal to 1 and BHV 326 is gated through multiplexer 334 and latched in IBHVREG 337. If neither AND gate has output equal to 1, then the output of NOR gate 335 is equal to 1 and ZERO BHV 336 is gated through multiplexer 334 into IBHVREG 337. The contents of IBHVREG 337 is then transmitted to cache/BHT directory 339 via IBHV lines 111. Cache control logic 101 will then store the IBHV in the entry being created and made valid for the line being fetched from memory.

Example of Operation

An example of the operation of the preferred embodiment will now be described. Assume the existence of a section of a computer program. The instructions in this section are partitioned into three cache lines whose concatenation of tag and set address (as in FIG. 2) are A, B, and C. Furthermore, the set address portions of A, B, and C are equal, i.e., lines A, B, and C will reside in the same set in the cache/BHT 102 of FIG. 1. Likewise, the BHVs for lines A, B, and C will reside in the same set in branch history cache 103. However, since cache/BHT 102 and branch history cache 103 have only two associativity classes, only two of the three lines can reside in these structures simultaneously. Valid lines are displaced from both the cache/BHT and branch history cache on an LRU basis. Assume that the behavior of the instructions in lines A, B, and C is that of a loop from A to B to C then back to A. This loop path is followed for at least two iterations. Referring now to FIG. 4, the state of cache/BHT 102 and branch history cache 103 (see FIG. 1) is described for two iterations of the loop. Under the "cache/BHT" heading, two columns are shown, one for each associativity class in the cache/BHT. A dash in the column indicates an invalid entry (V bit equal to 0). A letter in the column indicates a valid cache/BHT entry for the line identified by the letter. Under the "BHC" heading, two columns are shown, one for each associativity class in the branch history cache. A dash in the column indicates an invalid entry (V bit equal to 0). A letter in the column indicates a valid branch history cache entry for the line identified by the letter. A solid arrow from the cache/BHT column to the BHC column indicates operation of the retention phase of the preferred embodiment on behalf of the code line identified by the head and tail of the arrow. A dashed arrow from the BHC column to the cache/BHT column indicates operation of the retrieval phase of the preferred embodiment on behalf of the code line identified by the head and tail of the arrow. Each of the rows 401 through 407 in the figure indicate the state of the sets in the cache/BHT and BHC as the loop from A to B to C and back to A is processed.

Initially, in row 401, all entries in the sets are invalid. In row 402, line A is brought in to the cache/BHT and a zero IBHV is supplied from the BHC. In row 403, line B is brought in to the cache/BHT and a zero IBHV is supplied from the BHC. In row 404, line C is brought in to the cache/BHT, displacing LRU entry A. The BHV for entry A is retained in the BHC. A zero IBHV is supplied for line C from the BHC. In row 405, line A is brought in to the cache/BHT, displacing LRU entry B. The BHV for entry B is retained in the BHC. The retained BHV for line A is retrieved from the BHC and is supplied to the cache/BHT as the IBHV for line A. In row 406, line B is brought in to the cache/BHT, displacing LRU entry C. The BHV for entry C is retained in the BHC. The retained BHV for line B is retrieved from the BHC and is supplied to the cache/BHT as the IBHV for line B. In row 407, line C is brought in to the cache/BHT, displacing LRU entry A. The BHV for entry A is retained in the BHC. The retained BHV for line C is retrieved from the BHC and is supplied to the cache/BHT as the IBHV for line C.

While we have described our preferred embodiment of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A digital computer system including:

a first storage mechanism for storing data to be processed and for storing branch prediction information for branch instructions included in said data;

a second storage mechanism coupled to said first storage mechanism through a register for receiving said branch prediction information from said first storage mechanism, including means for storing said branch prediction information, for retrieving said stored branch prediction information, and for transmitting said stored branch prediction information to said first storage mechanism, and means for selecting among valid branch prediction information to be transferred from said first storage mechanism to said second storage mechanism.

2. A digital computer system as recited in claim 1, wherein one of said first storage mechanism and said second storage mechanism is partitioned into a plurality of sets.

3. A digital computer system as recited in claim 1, wherein both said first storage mechanism and said second storage mechanism are partitioned into the same associativity classes and sets.

4. A digital computer system as recited in claim 1, wherein one of said first storage mechanism and said second storage mechanism is a two-way associative memory.

5. A digital computer system as recited in claim 1, wherein both said first storage mechanism and said second storage mechanism are two-way associative memories.

* * * * *